(12) United States Patent
Tofach

(10) Patent No.: US 12,429,142 B2
(45) Date of Patent: Sep. 30, 2025

(54) LOW PRESSURE FLUID FLOW CONTROL VALVE

(71) Applicant: Matan Tofach, Beit Zera (IL)

(72) Inventor: Matan Tofach, Beit Zera (IL)

(73) Assignee: AQUEDUCT IRRIGATION TECHNOLGIES LTD., Hod Hasharon (IL)

( * ) Notice: Subject to any disclaimer, the term of this patent is extended or adjusted under 35 U.S.C. 154(b) by 171 days.

(21) Appl. No.: 18/008,172

(22) PCT Filed: Jun. 4, 2021

(86) PCT No.: PCT/IL2021/050671
§ 371 (c)(1),
(2) Date: Dec. 4, 2022

(87) PCT Pub. No.: WO2021/245680
PCT Pub. Date: Dec. 9, 2021

(65) Prior Publication Data
US 2023/0287985 A1    Sep. 14, 2023

(30) Foreign Application Priority Data
Jun. 4, 2020 (IL) .......................................... 275151

(51) Int. Cl.
| F16K 17/34 | (2006.01) |
| A01G 25/02 | (2006.01) |
| F16K 7/07 | (2006.01) |
| F16K 21/02 | (2006.01) |

(52) U.S. Cl.
CPC ............ *F16K 17/34* (2013.01); *A01G 25/023* (2013.01); *F16K 7/07* (2013.01); *F16K 21/02* (2013.01)

(58) Field of Classification Search
CPC . F16K 17/34; F16K 7/07; F16K 21/02; A01G 25/023; Y02A 40/22; B05B 1/3006; B05B 1/02
USPC .................................................. 239/542, 547
See application file for complete search history.

(56) References Cited

U.S. PATENT DOCUMENTS

| 2,515,073 A | 7/1950 | Binnall et al. |
| 3,767,124 A | 10/1973 | Spencer |
| 4,077,570 A * | 3/1978 | Harmony ................ B05B 1/323 239/533.13 |
| 4,113,180 A | 9/1978 | Christy et al. |
| 4,190,206 A | 2/1980 | Atkinson et al. |
| 4,313,471 A | 2/1982 | Lissau |
| 4,382,549 A | 5/1983 | Christy et al. |

(Continued)

FOREIGN PATENT DOCUMENTS

| CN | 201742791 | 2/2011 |
| CN | 107593373 | 1/2018 |

(Continued)

*Primary Examiner* — Craig M Schneider
*Assistant Examiner* — Andrew J Rost
(74) *Attorney, Agent, or Firm* — The Law Office of Joseph L. Felber

(57) ABSTRACT

A flow control valve providing a constant outflow in a variable inflow fluid pressure environment from as low as 0 bar and at least up to 6 bar. The flow valve comprises a flow control surface that features at least one flow control opening for controlling the outflow through the valve. The flow control opening configured to have a triangular-like polygonal configuration.

27 Claims, 12 Drawing Sheets

(56) References Cited

U.S. PATENT DOCUMENTS

| | | | |
|---|---|---|---|
| 4,627,573 A | | 12/1986 | Havens |
| 4,722,481 A | * | 2/1988 | Lemkin ................ A01G 25/023 |
| | | | 137/513.5 |
| 4,824,025 A | | 4/1989 | Miller |
| 4,869,432 A | | 9/1989 | Christy |
| 4,909,441 A | * | 3/1990 | Christy ................ B05B 1/3006 |
| | | | 239/533.13 |
| 5,400,973 A | | 3/1995 | Cohen |
| 8,763,934 B2 | * | 7/2014 | Patel .................... A01G 25/023 |
| | | | 239/533.1 |
| 9,485,923 B2 | * | 11/2016 | Ensworth ................ B29C 48/09 |
| 10,034,439 B2 | | 7/2018 | Kidachi |
| 10,172,302 B2 | * | 1/2019 | Keren ..................... B05B 1/205 |
| 2003/0226913 A1 | | 12/2003 | Brunnengraeber et al. |

FOREIGN PATENT DOCUMENTS

| | | |
|---|---|---|
| EP | 0 043 255 | 1/1982 |
| WO | 2014/049220 | 4/2014 |

\* cited by examiner

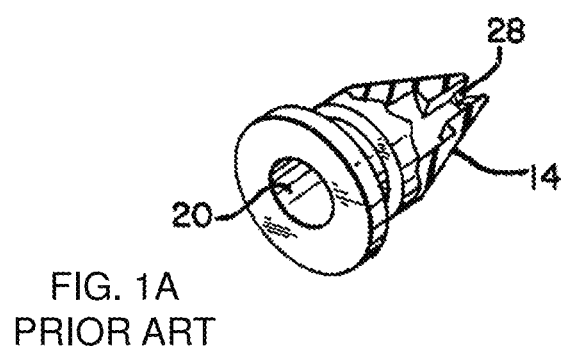
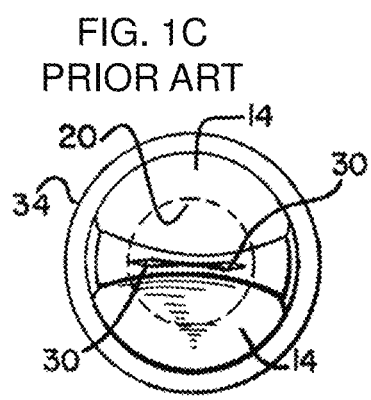
FIG. 1A PRIOR ART
FIG. 1C PRIOR ART
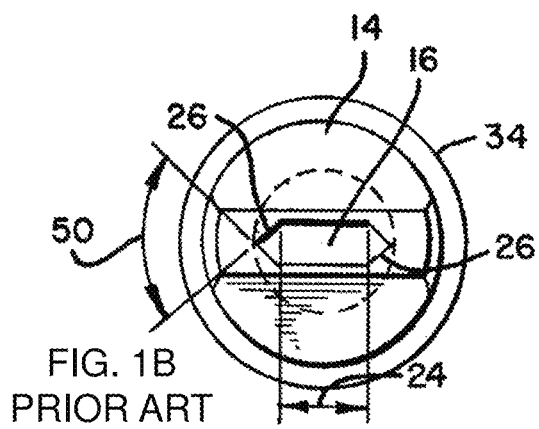
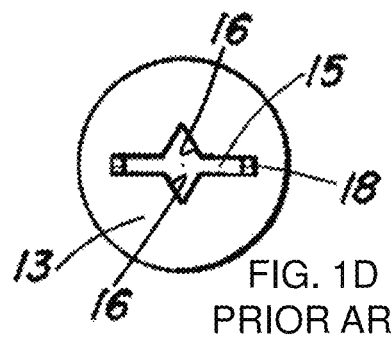
FIG. 1B PRIOR ART
FIG. 1D PRIOR ART
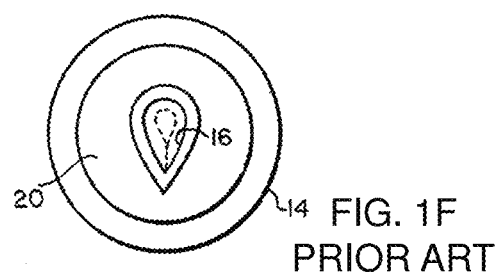
FIG. 1F PRIOR ART
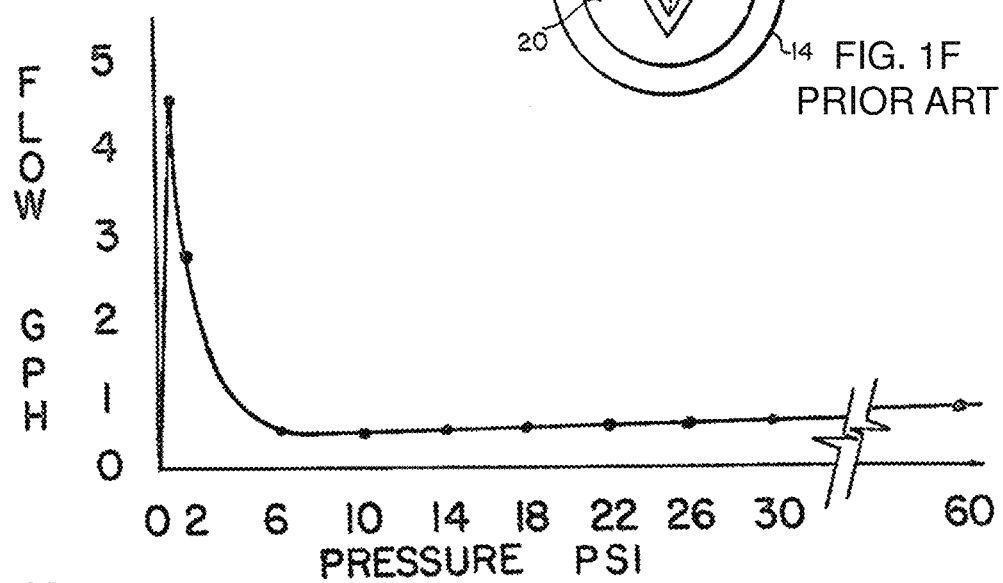
FIG. 1E PRIOR ART

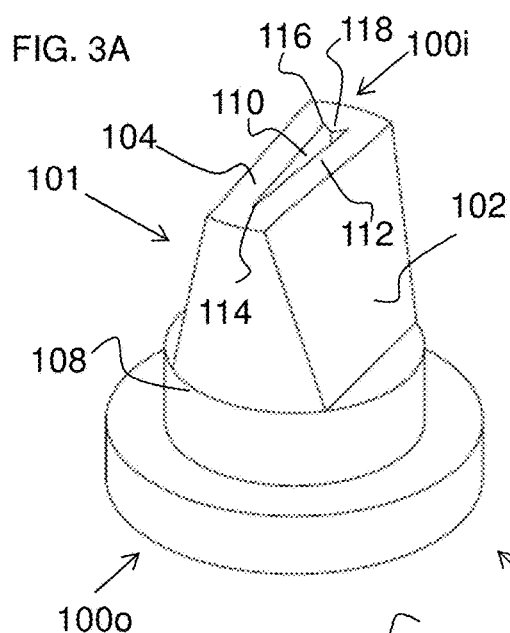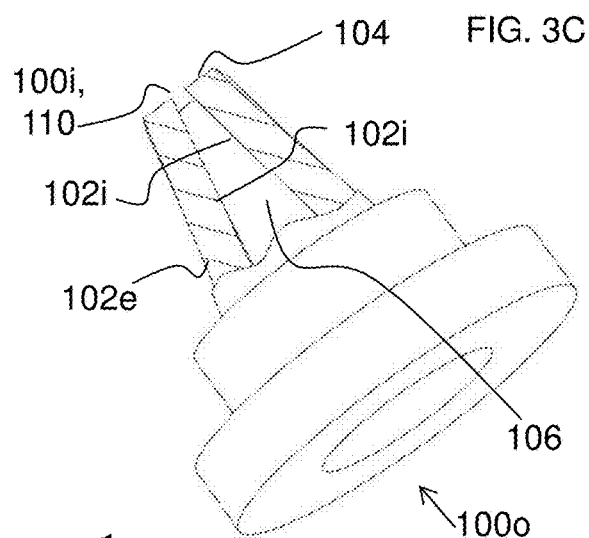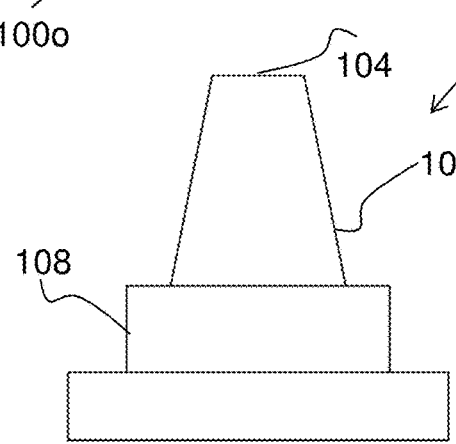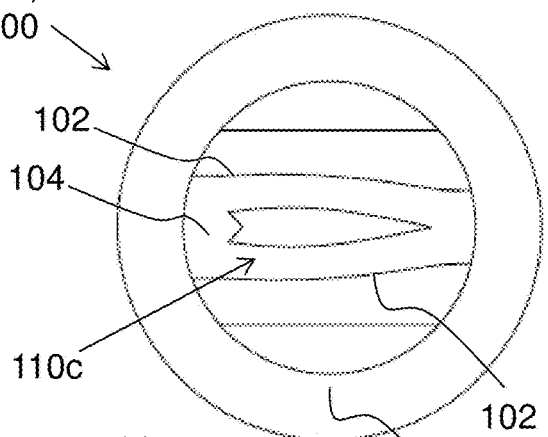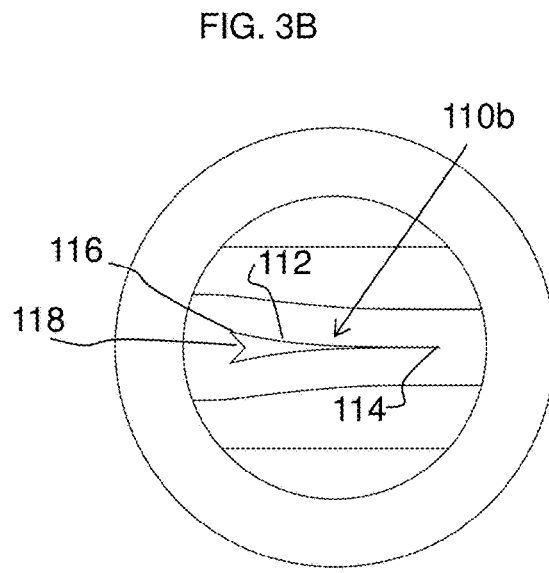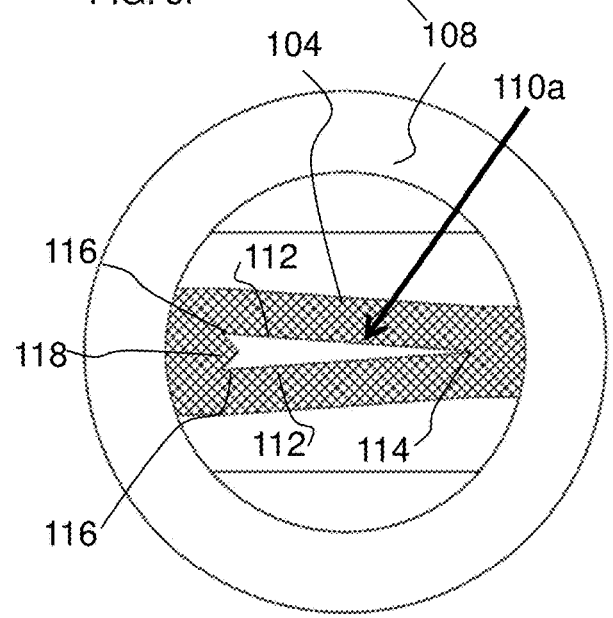

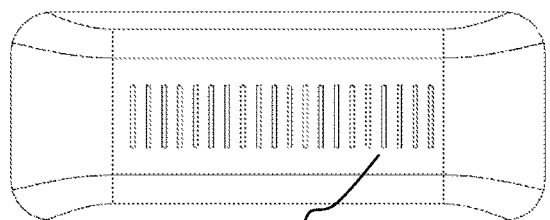
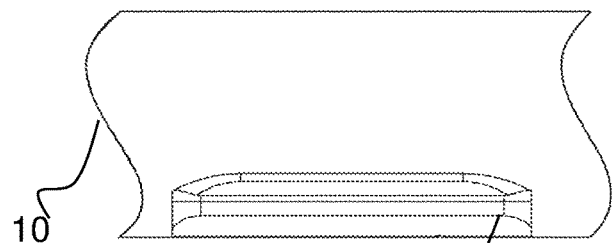
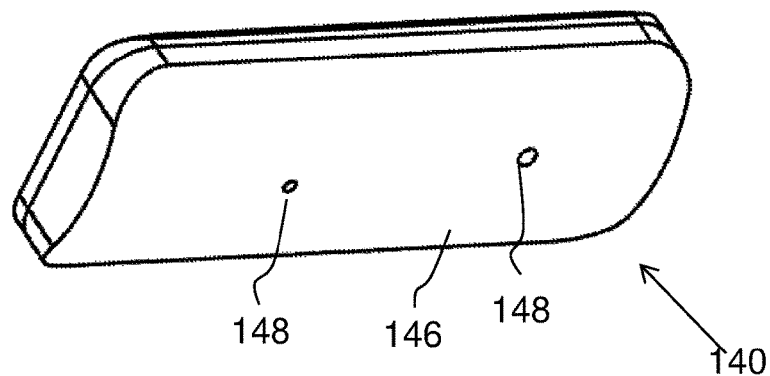
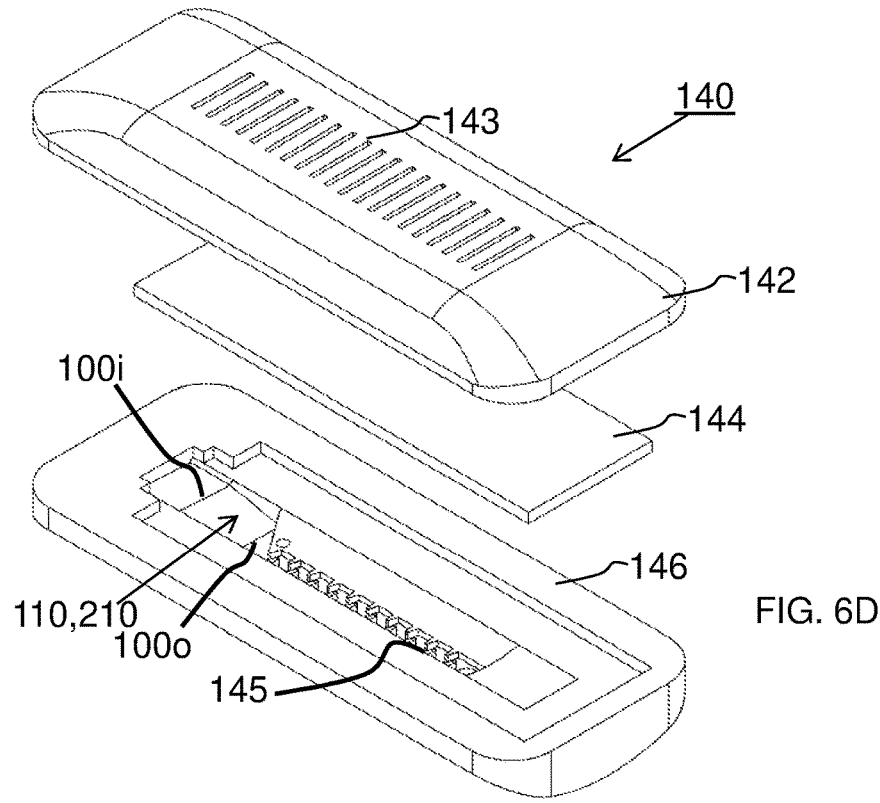

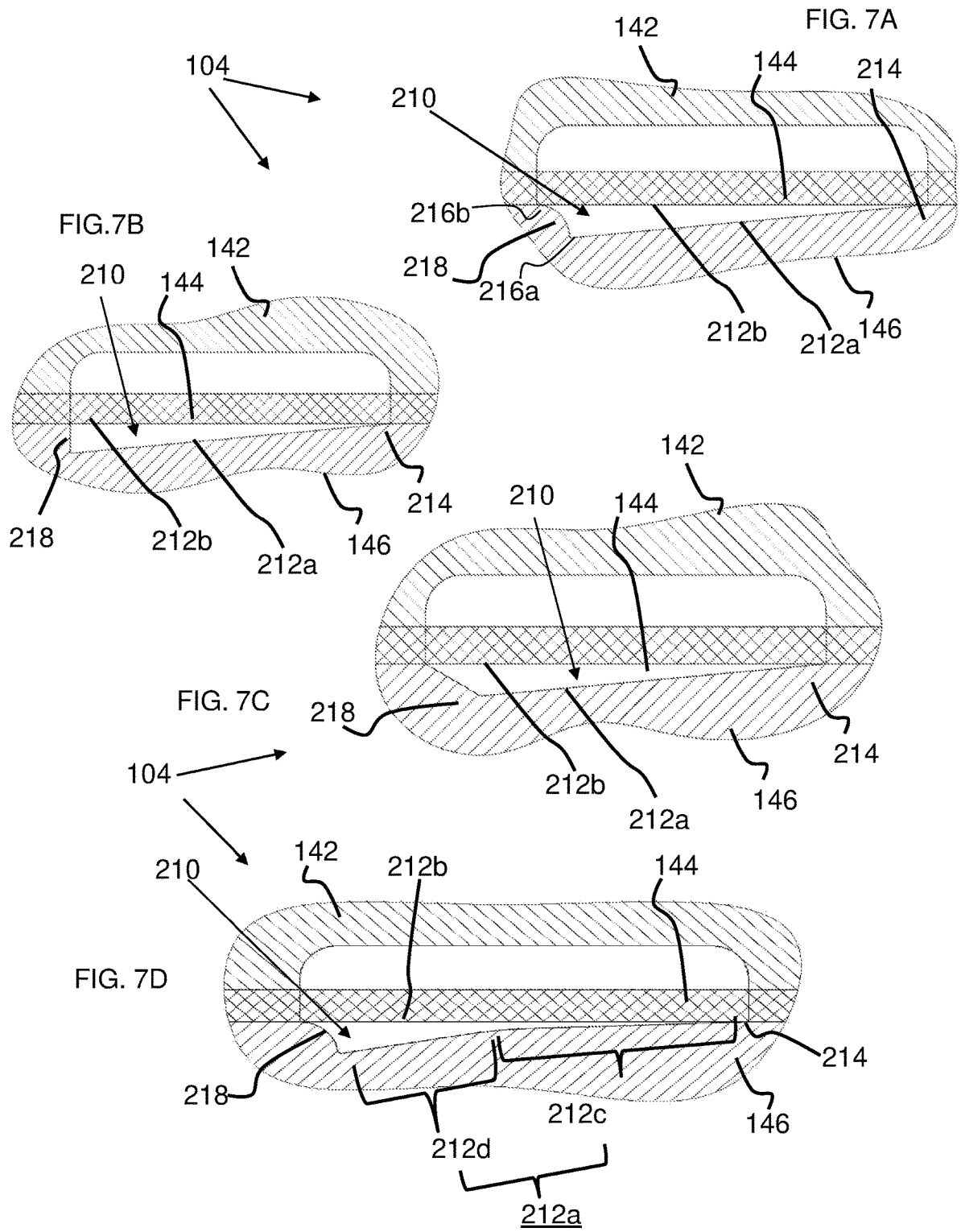

FIG. 9
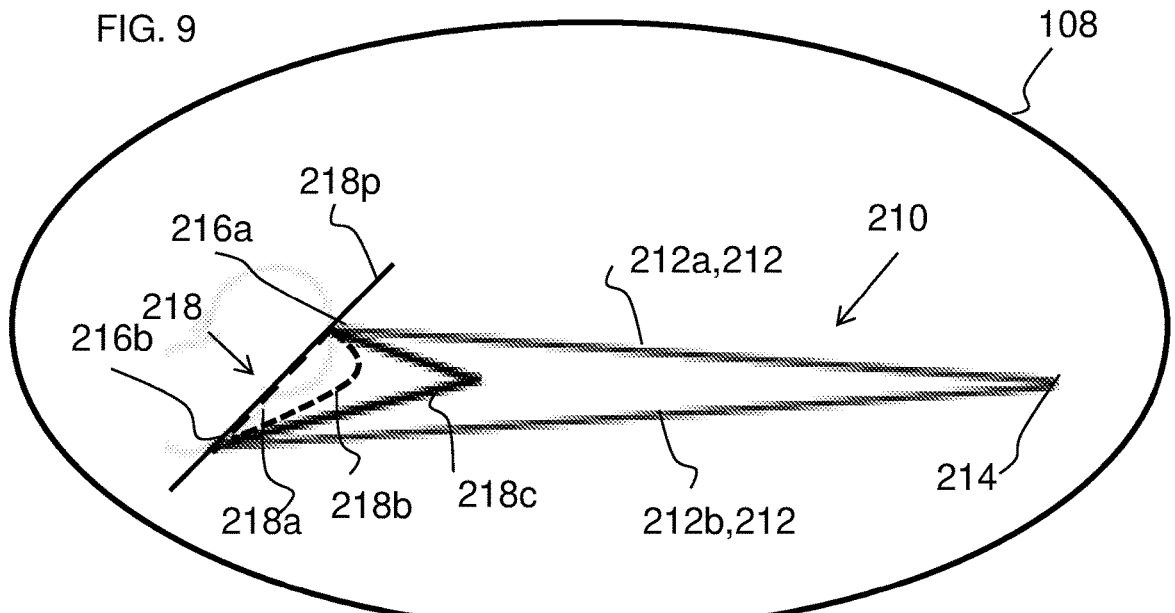
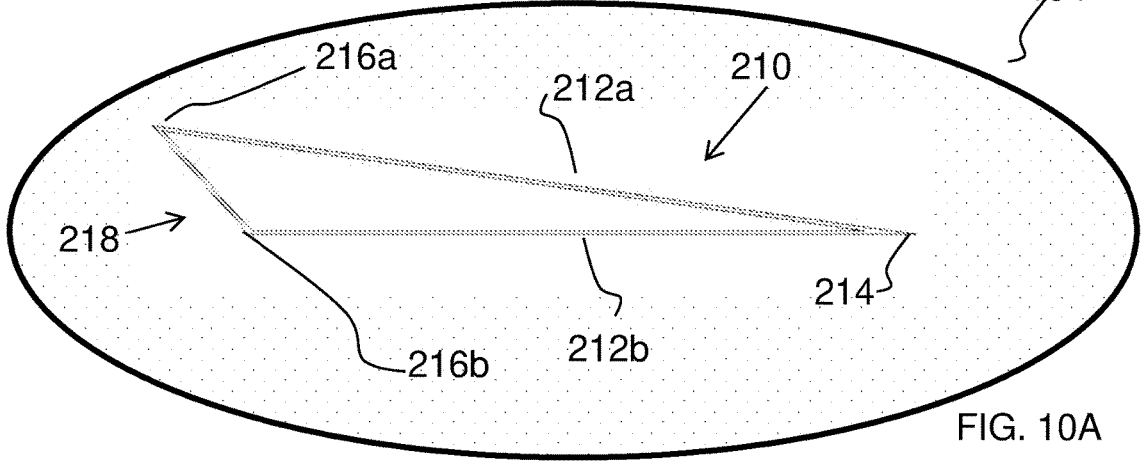
FIG. 10A
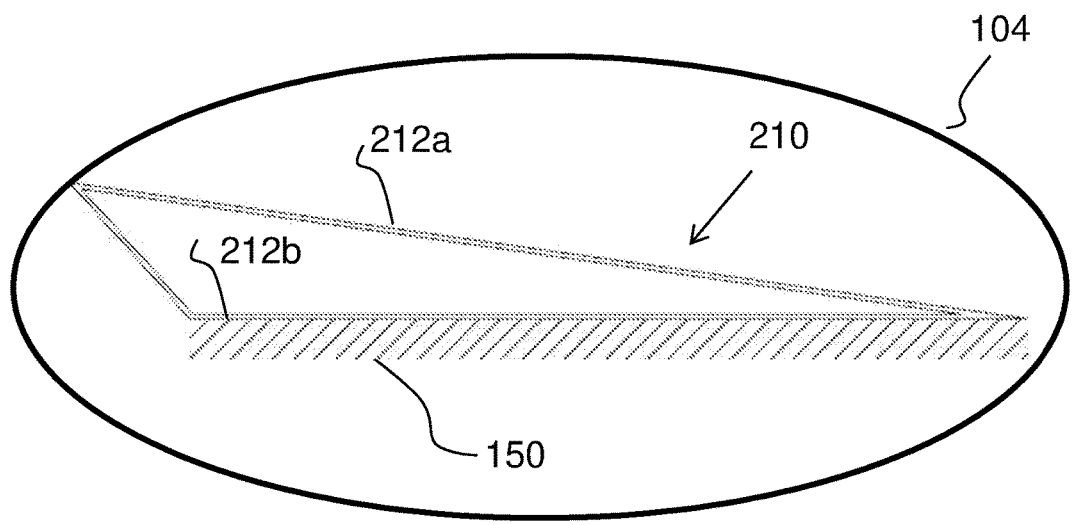
FIG. 10B

LOW PRESSURE FLUID FLOW CONTROL VALVE

FIELD OF THE INVENTION

The present invention relates to a device and system for a low pressure control valve and in particular, to a control valve that is functional in environments of very low flow pressures.

BACKGROUND OF THE INVENTION

Irrigation systems and controlled fluid flow systems are used to control fluids delivered to various agricultural applications from homegrown gardens to large scale agricultural crop operations. Such irrigation system allows for controlled delivery of fluids, fertilizer, water to the growing crops. The irrigation systems need to deliver fluids, primarily water, to the crops under different conditions of water quality and/or water flow.

In the operation of a drip or trickle irrigation system, continuous and consistent fluid flow is maintained in a controllable manner during the irrigation process. During operation, the irrigation system must be e readily cleaned so as to reduce susceptibility to clogging. Clogging may occur, for example with small dirt particles that are in the natural surroundings of an irrigation system. Such clogging can lead to greatly reduced fluid flow pressure and in turn to permanent damage to the irrigation system or parts thereof.

The water industry has various innovations to try to overcome this problem. For example, water filtration systems, drip irrigators, in-line emitters, on-line emitters.

U.S. Pat. No. 4,190,206 to Atkinson et al, discloses an emitter suitable for drip irrigation which includes a flow control valve having an inlet opening that constricts in response to pressure increases to provide a uniform flow despite pressure variations in the line system to attempt to provide a constant flow rate for an irrigation system. Similar solutions are discussed in U.S. Pat. Nos. 4,313,471 and 4,869,432.

U.S. Pat. No. 4,627,573 to Havens, discloses an emitter suitable for drip irrigation which includes two flow control orifices that work in concert so as to constrict in response to two different pressure changes. A first flow control orifice, having a teardrop configuration, is configured to function in a pressure environment of up to 8 PSI, about 0.5 bar while a second flow control orifice, having a tubular configuration, is required so as to maintain the pressure differential across the first flow control orifice to remain below 8 psi. Therein both flow control orifices are required to work in unison to achieve sufficient flow control above about 8 PSI.

Similar developments are also described in the following Patent Publications EP0043255, CN107593373, WO14049220, US2003226913, U.S. Pat. Nos. 2,515,073, 3,767,124, 4,382,549, 4,824,025, CN201742791, U.S. Pat. No. 4,113,180.

SUMMARY OF THE INVENTION

The present invention is provided to overcome the deficiencies of the background art in that they utilize a flow control orifice that has a circular configuration once it reaches its maximal functional pressure. For example, U.S. Pat. No. 4,627,573 to Havens discloses a flow control orifice having a teardrop configuration, FIG. 1F, however such a configuration is inherently limited as the orifice assumes a symmetric circular configuration, once exposed to a predetermined maximal pressure point, that is relatively low defined as 8 PSI equivalent to about 0.5 bar. However, the teardrop configuration requires a secondary flow control orifice in order to maintain differential pressure of 8 PSI.

Despite the various advancements in irrigation technology presented by the background art there remains an unmet need for a very low pressure flow control valve for example in the form of an irrigation emitter that can readily and properly function to provide a substantially constant fluid outflow in fluid pressure inflow environment that are below 6 bar and preferably in a fluid pressure environment of near zero pressure that is below 1 bar and most preferably in a fluid pressure environment of near zero pressure that is from about 0.005 bar and below 1 bar.

In some embodiments the low pressure flow control valve for example in the form of an irrigation emitter, can readily and properly function at inflow fluid pressure pressures that are below up to about 6 bar. In embodiments the valve of the present invention provides a constant fluid outflow at inlet fluid pressures that may for example be at or below about 1 bar, or 2 bar, or 3 bar, or 4 bar, or 5 bar, or 6 bar.

In some embodiments the flow valve according to embodiments of the present invention can readily and properly function to delivery constant fluid outflow at about zero inflow pressure, for example in a fluid inflow pressure environment that is below 0.25 bar.

In some embodiments the low pressure valve according to the present invention provides for emitting a substantially constant fluid outflow at fluid inflow pressures that are below about 1 bar and as optionally at or below about 0.005 bar.

In embodiments the valve of the present invention provides a constant fluid outflow at very low inlet fluid pressures that may for example be of about: 1 bar, 0.95 bar, 0.9 bar, 0.85 bar, 0.8 bar, 0.75 bar, 0.7 bar, 0.65 bar, 0.6 bar, 0.55 bar, 0.5 bar, 0.45 bar, 0.4 bar, 0.35 bar, 0.3 bar, 0.25 bar, 0.20 bar, 0.15 bar, 0.10 bar, 0.05 bar, 0.0.045 bar, 0.04 bar, 0.035 bar. 0.03 bar, 0.025 bar, 0.02 bar, 0.015 bar, 0.01 bar, or 0.005 bar.

The present invention overcomes the deficiencies of the background by providing a flow control valve that readily functions and maintains substantially constant and/or predictable fluid outflow rates at fluid inflow pressures of below about 6 bar, optionally below about 1 bar, optionally and more preferably at inflow fluid pressure of about 0.005 bar, optionally and still more preferably at inflow fluid pressures lower than about 0.25 bar.

In embodiments, the low pressure flow valve is configured to provide substantially constant and/or configurable outflow rate at low inflow fluid pressure selected from at least one of the following inflow fluid pressure levels: 1 bar, 0.95 bar, 0.9 bar, 0.85 bar, 0.8 bar, 0.75 bar, 0.7 bar, 0.65 bar, 0.6 bar, 0.55 bar, 0.5 bar, 0.45 bar, 0.4 bar, 0.35 bar, 0.3 bar, 0.25 bar, 0.20 bar, 0.15 bar, 0.10 bar, 0.05 bar, 0.0.045 bar, 0.04 bar, 0.035 bar. 0.03 bar, 0.025 bar, 0.02 bar, 0.015 bar, 0.01 bar, or 0.005 bar.

In embodiments the low pressure flow valve may be provided in various forms for example including but not limited to a drip irrigation flow valve, irrigation emitter, irrigation valve, sprinkler, pressure compensated emitter, pressure compensated dripper or the like.

In embodiments the control flow valve of the present invention allows controlled flow of any flowing fluid.

Furthermore, the low pressure flow valve according to embodiments of the present invention overcomes the deficiencies of the prior art in that the valve of the present invention allows for maintaining a substantially constant fluid outflow even during periods of abrupt pressure changes, for example when an inlet flow pipe is opened and/or closed, generally experienced when a flow starts or ends.

Embodiments of the present invention for a flow control valve that provides a constant fluid outflow in a variable inflow fluid pressure environment, the flow valve comprises: a body portion having a flow port therethrough defining an inlet at one end and an outlet at an opposite end; the inlet features a flow control surface and at least two side walls extending distal from the control surface toward the outlet; at least a portion of the inlet comprising pliable materials configured to render the inlet reactive to pressure changes applied to at least a portion of the inlet; and wherein in response thereto the flow control surface regulates outflow through the flow control valve; the flow control surface featuring at least one flow control opening for controlling the outflow through the valve; the at least one flow control opening having a polygon configuration defining two edges having a single common vertex, each of the edges having a second vertex that is spaced apart by a distance defining a base of the polygon and wherein the base does not extend beyond an imaginary plane formed external to the second vertex; and wherein in response to an increase in pressure applied to the inlet at least one of the base or at least one the two edges are configured to collapse internally to the flow control opening toward one another.

In embodiments a first edge of the two edges may be provided from non-pliable materials and wherein a second edge may be provided from pliable materials.

In embodiments a first edge of the two edges and a second edge of the two edges may be provided from materials of different degrees of pliability and/or from different materials.

In embodiments a first edge of the two edges and a second edge of the two edges may be provided from different materials.

In embodiments the degree of pliability of the first edge may be configured to be smaller than the degree of pliability of the second edge, wherein the second edge may be more pliable than the first edge.

In embodiments the base and the first edge may be provided from non-pliable materials and wherein the second edge may be provided from pliable materials.

In embodiments the base may be linear along the imaginary plane.

In embodiments the base may be linear having n edges wherein n is at least two or more.

In embodiments the base extends internal to the opening and may be configured to be one of: convex, curvilinear, arcuate, ellipsoid, curved, or circular.

In embodiments the two edges may be of equal in length, forming an isosceles polygon configuration.

In embodiments the two edges may have different lengths defining a first edge and a second edge.

In embodiments at least one of the two edges may be formed from at least two sub-segments. In embodiments at least one of the two sub-segments may be curvilinear. In embodiments the at least two sub-segments may be configured to have a different angle relative to at least one vertex.

In embodiments the flow control surface comprises at least two flow control openings.

In embodiments the flow control opening may be centered along the flow control surface.

In embodiments the flow control opening may be disposed along the flow control surface in a manner selected from one of the group for example including but not limited to: centrally, symmetrically, asymmetrically, symmetric along at least one axis, asymmetric along at least one axis, or the like.

In embodiments the body and/or flow control surface may be fit within a housing selected from the group for example including but not limited to a drip irrigator housing, an inline assembly, flag dripper assembly, a flag dripper assembly, a flag dripper assembly, a pressure compensated housing.

In embodiments the housing may form at least a portion of a flag dripper assembly.

In embodiments the housing may form at least a portion of a flag dripper assembly.

In embodiments the housing may form at least a portion of a pressure compensated housing including a diaphragm wherein a portion thereof defines at least one of the at least two side walls and one of the at least two edges.

In some embodiments the pressure compensated housing may further comprise at least one or more members for example including but not limited to a filter and/or a fluid flow labyrinth.

In some embodiments of the pressure compensated housing at least one of the at least two side walls may be formed by at least a portion of the pressure compensated housing.

In some embodiments of the pressure compensated housing the base may be formed by at least a portion of the pressure compensated housing.

In embodiments the optional housings may be integrated with a pipe and/or a flow pipe.

In embodiments the housing may be provided in the form of an emitter.

In embodiments the housing may be a sprinkler valve.

In embodiments the flow control surface may be configured to have a non-uniform level of pliability surrounding the flow control opening. Optionally the non-uniform level of pliability surrounding the flow control opening may be disposed along at least a portion of at least one of the side edges or the base.

In embodiments the device may be configured to have at least two levels of pliability surrounding the flow control opening.

In embodiments each side edge may be individually configured to have an individual level of hardness and/or elasticity and/or flexibility and/or pliability.

Within the context of this application the term ISOSCELES POLYGON is referred to as a polygon with at least one line of symmetry and in which at least two sides are equal in length.

Within the context of this application the term fluid and/or flowing fluid may interchangeably refer to any fluid, liquid, gas, air, or a mixture thereof.

Within the context of this application the terms pliable and/or flexible and/or elastic materials may be used interchangeably to refer to materials that are responsive to changes in pressure.

As used herein the term "about" refers to +/−10%.

Within the context of this application the terms "comprises", "comprising", "includes", "including", "having" and their conjugates mean "including but not limited to". The term "consisting of" means "including and limited to". The term "consisting essentially of" means that the composition, method or structure may include additional ingredients, steps and/or parts, but only if the additional ingredients, steps and/or parts do not materially alter the basic and novel characteristics of the claimed composition, method or structure.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

As used herein, the singular form "a", "an" and "the" include plural references unless the context clearly dictates otherwise. For example, the term "a compound" or "at least one compound" may include a plurality of compounds, including mixtures thereof.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

In those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

As used herein the term "method" refers to manners, means, techniques and procedures for accomplishing a given task including, but not limited to, those manners, means, techniques and procedures either known to, or readily developed from known manners, means, techniques and procedures by practitioners of the chemical, pharmacological, biological, biochemical and medical arts.

Unless otherwise defined, all technical and scientific terms used herein have the same meaning as commonly understood by one of ordinary skill in the art to which this invention belongs. The materials, methods, and examples provided herein are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in order to provide what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIGS. 1A-D are illustration of prior art irrigation valves;

FIG. 1E is graph showing the fluid flow behavior of prior art irrigation valves in different pressure environments;

FIG. 1F is an illustration of a prior art irrigation valves;

FIGS. 3A-F show different views of a schematic illustration of a device according to optional embodiments of the present invention;

FIGS. 6A-D show different views of a schematic illustrations of a device according to an optional embodiment of the present invention, shown in the form of pressure compensated emitter;

FIGS. 7A-D shows different views of a schematic illustrations of a device according to an optional embodiment of the present invention, shown in the form of a pressure compensated emitter;

FIG. 9 is a schematic illustration of an optional embodiments according to embodiments of the present invention; and FIGS. 10A-C show various schematic illustrations of optional embodiments according to the present invention.

DESCRIPTION OF THE PREFERRED EMBODIMENTS

Figure 2:
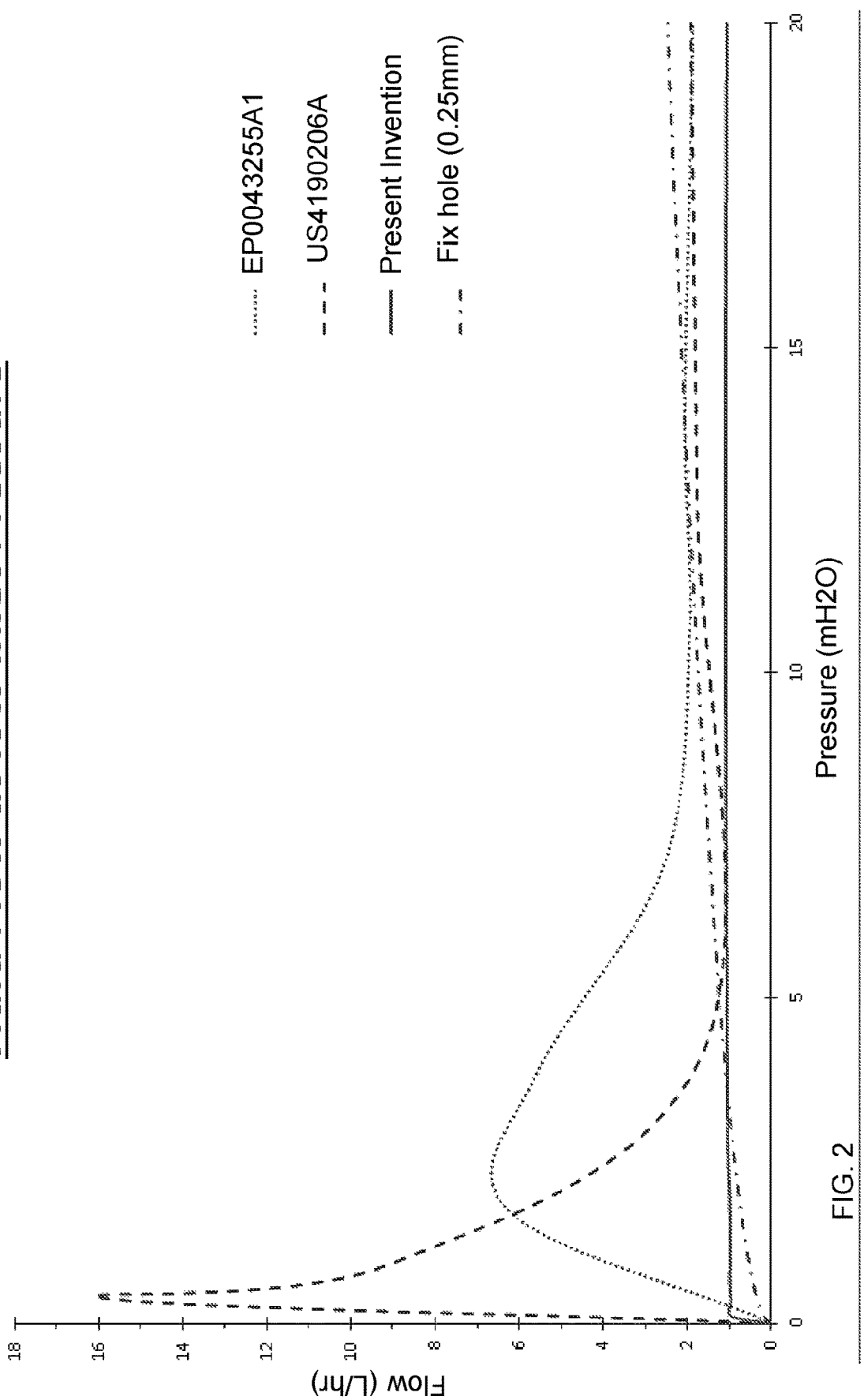
FIG. 2 is a graph comparing the fluid flow behavior of the flow valve according to embodiments of the present invention when comparted to the fluid flow response of prior art devices.

The principles and operation of the present invention may be better understood with reference to the drawings and the accompanying description. The following figure reference labels are used throughout the description to refer to similarly functioning components are used throughout the specification hereinbelow.

10 in line conduit flow pipe;
100 flow control valve;
100i flow control valve inlet;
100o flow control valve outlet;
102 pressure sensitive side wall;
102e side wall external surface;
102i side wall internal surface;
104 flow control surface;

106 internal flow volume;
108 body;
110 flow control opening;
110a open configuration; (zero pressure)
110b controlled configuration; (high pressure)
110c back flow configuration; (negative pressure)
112 side edges;
114 common vertex (first end);
116 second vertex (second end);
118 base;
118a trapezoid base;
118b arcuate base;
118c linear base;
120 multi slit flow control surface;
122 first flow control openings;
124 second flow control openings;
130 drip emitter;
140 flow compensation emitter housing;
142 upper housing portion;
143 filter member;
144 diaphragm;
145 fluid flow labyrinth;
146 lower housing portion;
148 exit holes;
150 edge hardness level;
150a,b edge hardness level;
210 flow control opening;
212 side edge;
212a first length side edge;
212b second length side edge;
214 common vertex (first end);
216a,b second vertex (second end);
218 base;

FIGS. 1A-D show prior art flow control valves as depicted in U.S. Pat. No. 4,190,206 to Atkinson et al. FIG. 1A shows a perspective view of the valve that includes a body portion 12 terminating in a pair of converging lips 14 which terminate in spaced apart relationship to each other to form an inlet opening 16. The valve functions to control flow by way of changing the shape of inlet opening 16.

FIG. 1B and FIG. 1D show prior art inlet opening in the open configuration. FIG. 1C shows a closed inlet opening of the inlet opening shown in FIG. 1B.

As can be seen the prior art inlet opening 16 is provided in the form of a symmetric central opening that is controlled centrally such that it is closed by applying pressure along the mid portion of the central opening, as shown in FIG. 1C, leaving two side opening labelled 30 in the prior art image.

FIG. 1E shows a replication of FIG. 11 depicted in U.S. Pat. No. 4,190,206 to Atkinson et al., this is a representative graph of the behavior of prior art irrigation control valves at different inlet fluid flow pressures. This is shown by graphically illustrates the relationship between flow in gallons per hour (GPH) as a function of pressure in pounds per square inch (PSI). FIG. 1E clearly highlights the limitations and drawback prior art irrigation control valves, as the graph clearly shows that at very low water pressure below 6 PSI, equivalent to about 4.2 mH2O (meter of water) wherein the prior art valve cannot properly regulate water flow at a constant flow rate. This inability to function at low pressures is a continuing problem in the art that is solved by embodiments of the present invention.

This problem is solved by embodiments of the present invention for a low pressure flow control valve 100, 130, 140, FIG. 3-7, according to the present invention. Wherein the low pressure flow control valve 100,130,140 provides a valve configured to produce a constant fluid outflow at very low fluid inflow pressures, practically as low as zero inflow pressure, for example as low as 0.005 bar, optionally below 0.25 bar, and below 1 to 6 bar.

FIG. 2 shows a comparative graph showing the behavior of prior art irrigation control valves, described in U.S. Pat. No. 4,190,206, European patent No. 43255, and in drip irrigation valve that has a fixed slit opening of 0.25 mm, in relation to the low pressure control valve provided 100,130, 140 according to embodiments of the present invention. FIG. 2 shows flow in liters per hour (L/h) as a function of inflow fluid pressure in mH2O (meter of water). It is clearly shown that at very low water pressure below 10 mH2O (equivalent to about 1 bar) and similarly below even at below 2.5 mH2O (equivalent to about 0.25 bar) the irrigation control valve according to the present invention maintains a substantially constant flow rate while the prior art control valves vastly fluctuates in pressure at such very low fluid pressure, particularly below 1 bar, and therefore cannot properly control water flow so as to provide a substantially constant outflow through the valve body.

Accordingly, embodiments of the present invention are particularly advantageous in environments where the inlet fluid pressure, for example water, is very low so as to not waste precious water. Furthermore, this allows for agricultural applications in remote areas that do not have consistent inflow water pressure or do not utilized pressurized water for irrigation. Similarly, uses of the device of the present invention is advantageous in any low fluid pressure environment, that is below about 6 bar, optional lower than about 1 bar, preferably lower than about 0.25 bar, and optionally and preferably as low as 0.005 bar and/or practically zero pressure, for example in environments that do not have the infrastructure necessary to allow for water to flow under pressure. Or similarly, require to set up an irrigation infrastructure where the water source is non-pressurized and obtained directly from a natural water source, not under pressure, such as rivers, lakes and the like water source. Such non-pressurized natural fluid sources globally form the overwhelming majority of water sources for agricultural purposes.

Embodiments of the present invention provides low pressure control valve capable of regulating water flow at very low inflow fluid pressure that are substantially below 6 bar and more preferably below 1 bar (equivalent to 10 mH2O, 14.5 psi), optionally and preferably below 0.5 bar (equivalent to 5 mH2O, 7.25 psi) and more preferably below 0.25 bar (equivalent to 2.5 mH2O, about 3.6 psi).

FIG. 3A shows a schematic illustration of a low pressure fluid flow control valve 100 according to an embodiment of the present invention. FIG. 3A provides a perspective view of device 100. FIG. 3B shows a side view of device 100. FIG. 3C shows a schematic partial cut away illustration revealing partial sectional view of device 100.

Device 100 is a fluid flow control valve featuring a fluid flow inlet 100i disposed proximally and a distally disposed fluid flow outlet 100o. Device 100 may be disposed and/or integrated in various non-limiting housings 108 a non-limiting example of which is shown in FIG. 3A-B in the form of a drip irrigation control valve. Device 100 is not limited to such housings and may be disposed in a plurality of optional functional housing for example as shown in FIGS. 5-7 and 11, wherein the housing 108 utilized is dependent on the irrigation application, for example including but not limited to an inline irrigation assembly, flag dripper assembly, drip irrigation assembly, online dripper assembly, a pressure compensation dripper assembly, single season on-surface irrigation assembly, multi-season on-surface irrigation, sub-surface irrigation assembly, the like or any combination thereof.

Device 100 comprises a body 101 defining a fluid flow port, therein allowing a fluid to flow from a proximally disposed an inlet 100*i* (first end) to a distally disposed outlet 100*o* (second end). At least a portion of body 101 is provided from pliable and/or elastic and/or flexible materials that are configured to render at least a portion of the inlet 100*i* reactive and/or responsive to fluid flow pressure changes applied to at least a portion of body 101. For example, pressure sensitive and/or flexible materials form at least a portion of body 101 and in particular at least a portion of inlet 100*i* may for example include but is not limited to silicone, rubber, polymers, the like, or any combination thereof.

The inlet 100*i* features a flow control surface 104 and at least two side walls 102 extending distal from the control surface 104 toward outlet 100*o*. Most preferably flow control surface 104 defines a flow control opening 110, also may be referred to as orifice. In embodiments flow control surface 104 may be provided from a single functioning member and/or part, that functions to control the flow control opening 110 for example as shown in FIG. 3A-F. In some embodiments flow control surface 104 may be provided from at least two or more functioning members and/or part—for example as depicted in FIGS. 6A-D and FIGS. 7A-D—that function to concertedly control the flow control opening 110. At least a portion of the inlet 100*i* is preferably provided from flexible and/or elastic materials configured to render at least a portion of the inlet 100*i* reactive and/or responsive to fluid flow pressure changes applied to at least a portion of the inlet for example including but not limited to: the inlet 100*i*, the flow control surface 104, flow control opening 110, the side walls 102 or any combination thereof.

For example, in response to pressure changes applied to at least a portion of inlet 100*i* the flow control surface 104 adapts its shape and/or configuration to assume different shapes wherein the different shapes allow for regulating and/or controlling the fluid flow and in particular the rate of fluid flow through the flow control valve 100 and body 101 from inlet 100*i* to outlet 100*o*.

A non-limiting example of some of the optional different shapes and/or configurations of the fluid flow control surface 104 are depicted in FIGS. 3D-F. FIG. 3D shows the full open configuration; FIG. 3E showing the controlling and/or closed position allowing for controlling the flow rate to a constant flow rate. FIG. 3F showing the negative pressure and/or reverse flow configuration where the valve is being cleaned to remove any debris.

The flow control surface 104 features at least one flow control opening 110 for controlling and/or limiting the flow through the valve body 101 at the inlet 100*i*. The flow control opening 110 is preferably configured to have a generally triangular or polygonal like shape. In some embodiments the flow control opening 110, for example as shown in FIG. 3A, is configured to have an isosceles polygon configuration including two equal length edges 112, FIG. 3D, having a first end forming single common vertex 114, and wherein each of the equal length edges 112 having a second end forming a second vertex 116 spaced apart by a distance defining a base 118 of the isosceles polygon shaped flow control opening 110. In embodiments base 118 is configured so as to not extend beyond an imaginary plane formed external to said second vertex 218*p*, shown in FIG. 9, instead, base 118 is formed either between the vertices 116 or internal to opening 110 toward common vertex 114, for example as shown.

In embodiments, base 118 may be provided with different shapes and/or configurations selected form linear, curvilinear, arcuate, elliptic, polygonal, curved, circular, semi-circular, the like geometric shape or any combination thereof.

Different configurations of base 118 may be utilized with flow opening 110 a non-limiting example of which is shown in FIGS. 3A, 3D and FIGS. 4A-4C and FIG. 9.

In embodiments vertex 114 is provided with an acute angel having an angle below 30 degrees, more preferably below 20 degrees and most preferably below 10 degrees.

In such non-limiting embodiments, the isosceles polygon configuration of flow control opening 110 provides for the low pressure functionality of the control valve 100 according to embodiments of the present invention. Wherein valve 100 delivers substantially constant fluid outflow through outlet 100*o* irrespective of a wide range of variable input fluid flow pressure established at inlet 100*i*, and in particular when input fluid pressure is below 1 bar, and optionally lower than 0.25 bar, and optionally at pressures from as low as about 0.005 bar. According to embodiments of the present invention control valve 100 functions to provide a constant predetermined output flow rate in environments where the input fluid pressure is below 1 bar, preferably below 0.25 bar, and optionally from an inflow pressure of about 0.005 bar.

In embodiments, flow control opening 110 may be disposed in any manner along flow control surface 104, for example including but not limited to centrally, symmetrically, asymmetrically, symmetric along at least one axis, asymmetric along at least one axis, or the like. For example, FIG. 3D shows a non-limiting example of opening 110 that is centrally and symmetrically disposed about surface 104.

In some embodiments, the hardness, elasticity, flexibility and/or pliability of surface 104 may be uniform.

In some embodiments, the hardness, elasticity, flexibility and/or pliability of surface 104 may be non-uniform having variable hardness and/or flexibility distribution along the surface 104.

In some embodiments, the hardness and/or elasticity and/or flexibility and/or pliability of surface 104 may be uniformly distributed around opening 110, wherein edges 112, and base 118 have the same level of hardness and/or elasticity.

In some embodiments, the hardness and/or elasticity and/or flexibility and/or pliability of surface 104 may be uniformly distributed around opening 110, wherein edges 112 have the same level of hardness and/or elasticity.

In some embodiments, the hardness and/or elasticity and/or flexibility and/or pliability of surface 104 may be non-uniformly distributed around opening 110, wherein at least a portion of edge 112, and/or at least a portion of base 118 are configured to have a non-uniform level of hardness and/or elasticity.

In some embodiments, the hardness and/or elasticity and/or flexibility and/or pliability of surface 104 may be non-uniformly distributed around opening 110, wherein base 118 and/or each edge 112 may be individually configured to have an individual level of hardness and/or elasticity and/or flexibility and/or pliability.

In some embodiments, surface 104 may be provided from at least two or more different materials having variable degree and/or levels of hardness and/or elasticity and/or flexibility and/or pliability around opening 110. For example, base 118 and/or each edge 112 may be individually configured to be from different materials having an individual level of hardness and/or elasticity and/or flexibility and/or pliability.

FIG. 3C shows a partial cut away perspective view of a portion of valve 100 and in particular inlet 100*i* to reveal the internal working of device 100. FIG. 3C particularly shows the internal surface 102*i* of side walls 102 extending distally and internally from flow control surface 104 to define the configuration of flow control opening 110. Preferably internal surface 102*i* is disposed at an angle from inlet 100*i* toward outlet 100*o* forming an internal flow volume 106. In embodiments preferably the application of pressure builds up along the external surface 102*e* of side walls 102 cause internal walls 102*i* to close by way of collapsing toward one another in a directional manner from vertex 114 (FIG. 3D) along the length of side edges 112 (FIG. 3D) toward second end vertex 116, for example as shown in FIG. 3E showing controlled configuration 110*b*.

In embodiments the wall thickness of side walls 102 defined between internal surface 102*i* and external surface 102*e* may be configurable according to the materials and/or material properties forming valve 100 and in particular inlet 100*i*.

In embodiments the angle assumed by side walls 102 relative to flow control surface 104 may be configurable according to the materials and/or material properties forming valve 100 and in particular inlet 100*i*.

In embodiments the shape of flow control surface 104 may be configures according to the materials and/or material properties forming valve 100 and in particular inlet 100*i*.

Figure 4A:
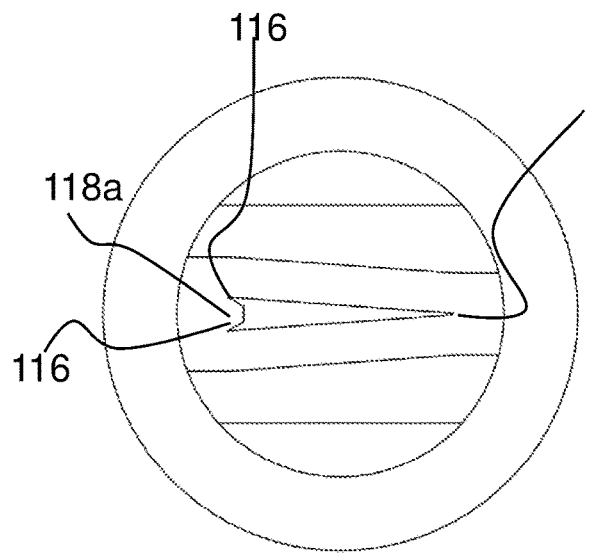
FIGS. 4A-D show schematic illustrations of a device according to optional embodiments of the present invention.
Figure 4B:
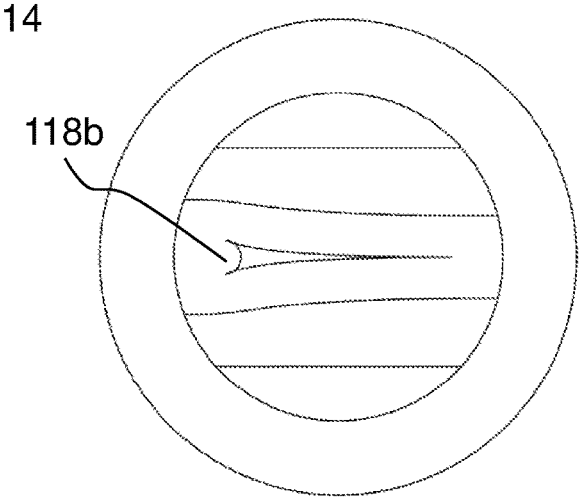
Figure 4C:
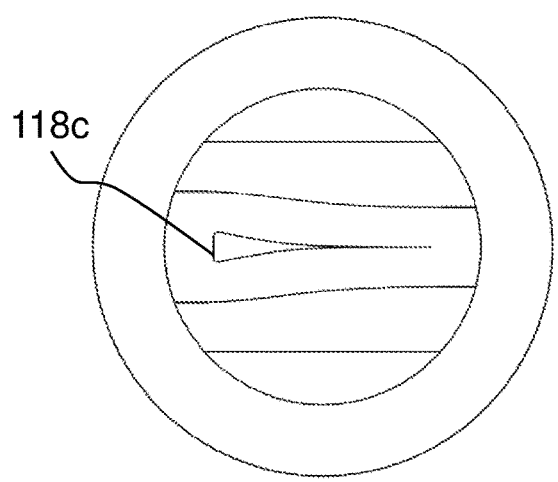

FIG. 4A-D show optional configuration of flow control surface 104 and flow control opening 110 according to embodiments of the present invention. FIG. 4A-C show flow control opening wherein base 118 assumes optional geometric forms. FIG. 4A showing polygonal base 118*a* having a trapezoid configuration between vertices 116 and extending internally to opening 110 toward vertex 114. FIG. 4B shows a curved base 118*b*, most preferably convex that extends internally toward opening 110 and vertex 114. FIG. 4C shows a linear base 118*c* having a single edge that couples vertices 116.

Figure 4D:
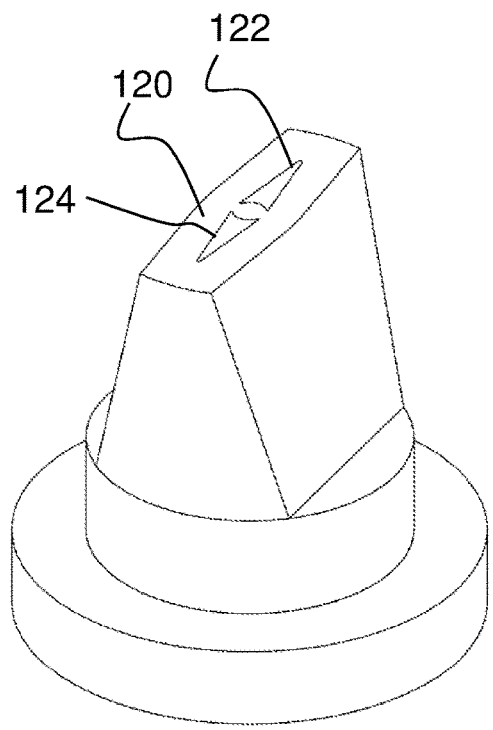

FIG. 4D shows an optional embodiment of flow control surface 120 that features two flow control openings a first flow control opening 122, and a second flow control opening 124. In embodiments flow control surface 104 may feature at least one flow control opening or more flow control openings. For example, as shown in FIG. 4D flow control surface 104 is shown in the form of a multi slit and/or orifice flow control surface 120 having two flow control opening 122, 124, respectively each having an isosceles polygonal configuration as previously described. In embodiments a plurality of flow control opening may be arranged along the flow control surface 104 in any manner. For example, as shown in FIG. 4D where the base is at the center of control surface, however, this is not a limiting configuration, optionally each of the vertex and/or base of individual flow control openings may be configured relative to one another in any way.

FIGS. 5-7 show the utilization of device 100 in variable housings 108 for variable applications.

Figure 5A:
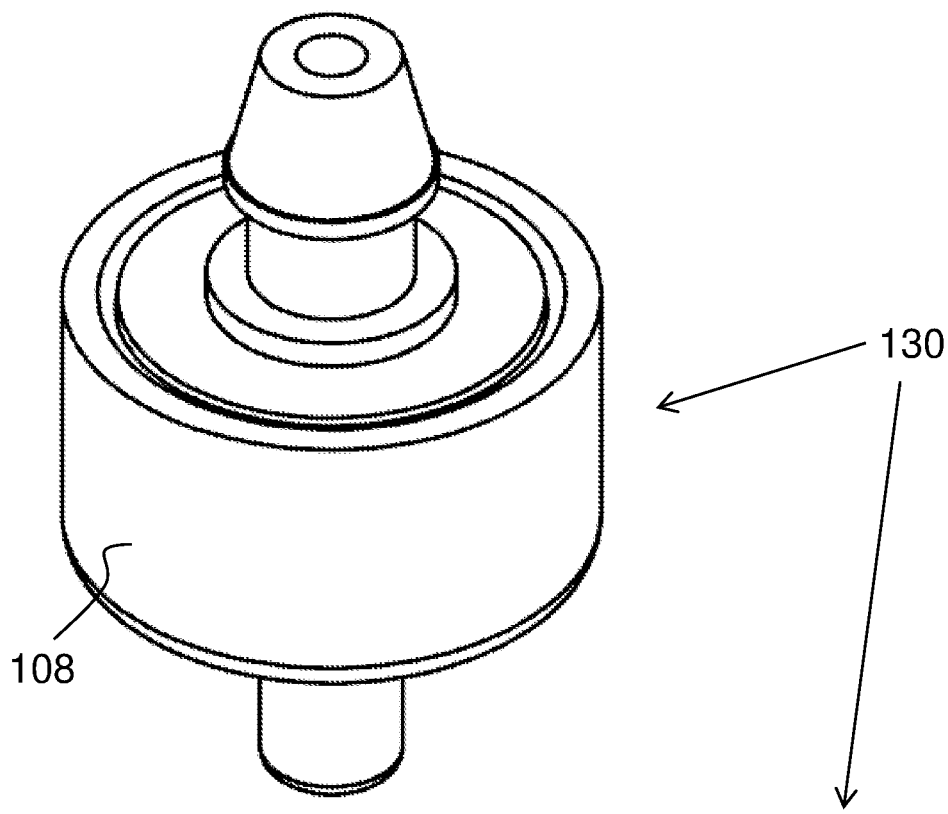
FIGS. 5A-D show different views of a schematic illustrations of a device according to an optional embodiment of the present invention.
Figure 5B:
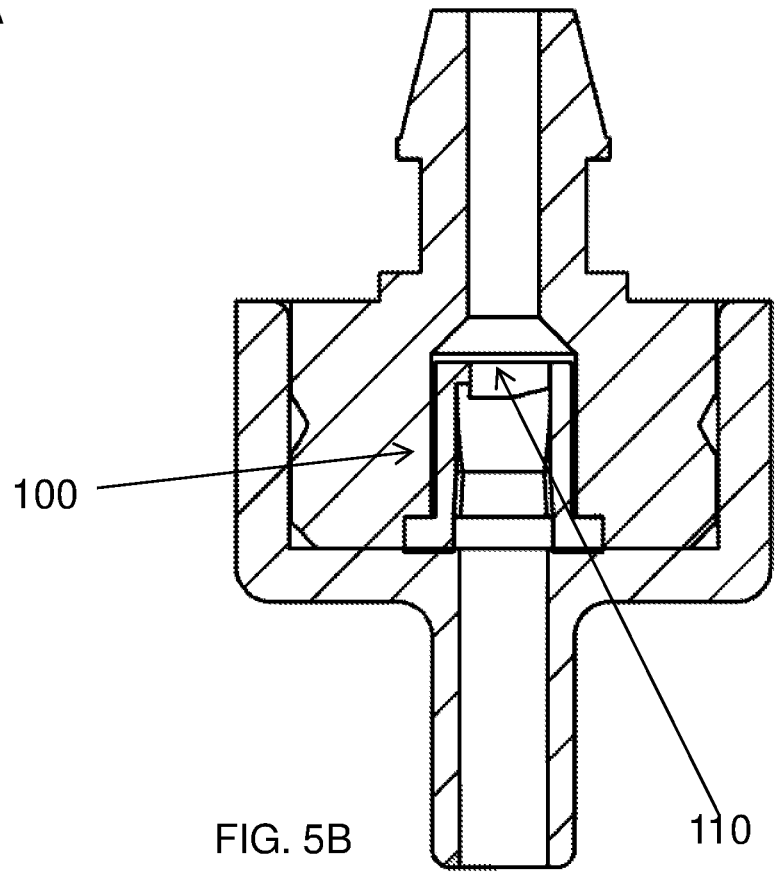

FIGS. 5A-B shows device 100 incorporated with a drip emitter 130 having a dedicated housing 108.

Figure 5C:
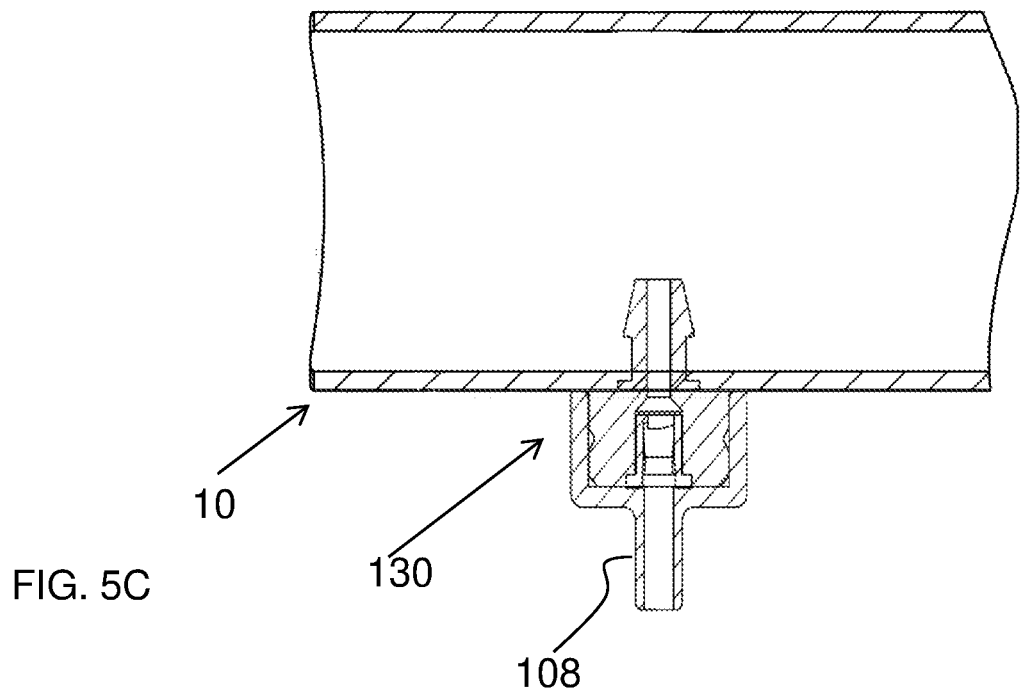
Figure 5D:
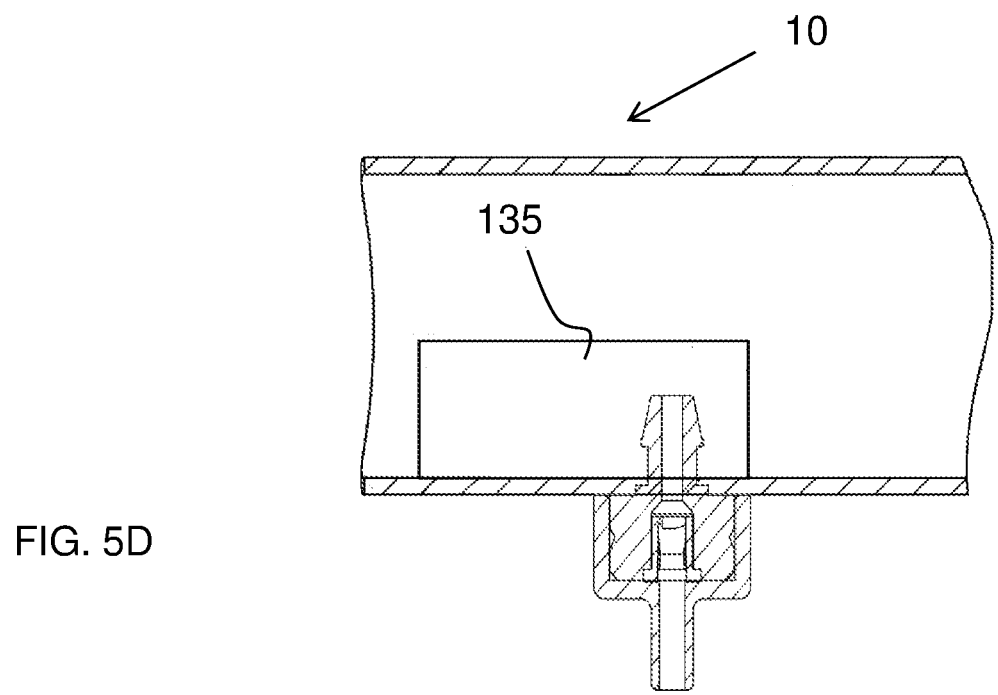

FIGS. 5C-D shows use of device 100 that is associated with a flow tube a non-limiting example of which is shown in the form of an irrigation pipe 10 wherein the flow control valve 100 may be utilized along an external surface of irrigation pipe 10, what is also known in the art as an on-line dripper assembly. FIG. 5C shows an optional embodiment for an on-line dripper assembly where the drip emitter 130 is directly coupled to an external surface of a pipe for example in the form of an irrigation pipe 10. FIG. 5D shows a further optional embodiment for an on-line dripper assembly wherein drip emitter 130 is used with and/or associated with and/or integrated with a flow compensation housing 140. The flow compensation housing 135 may comprise a fluid flow labyrinth, diaphragm, filter, the like or any combination thereof.

FIGS. 6A-D show an optional embodiment of the device 100 present invention that is integrated within a pressure compensated emitter housing 140. FIG. 6A shows a perspective top view of emitter housing 140, showing the upper housing portion 142 featuring a filter portion 143. FIG. 6B shows housing 140 within a segment of pipe 10. FIG. 6C shows a bottom view of emitter housing 140 revealing at least one exit port 148, optionally the pressure compensated emitter 140 may feature two exit ports 148 a non-limiting example of which is shown.

FIG. 6D shows an exploded view of emitter housing 140 revealing the upper housing portion 142 featuring a filter 143, a diaphragm 144, a lower housing 146 featuring a flow control opening 110, 210 according to optional embodiments of the present invention. Flow controlling opening 210 labelled with respect to pressure compensated emitter 140 functions similar to flow controlling opening 110 of device 100 as previously described, accordingly all functioning parts and members thereof are labelled in a similar fashion for ease of understanding.

In some embodiments, filter 143 may be integrated with housing portion 142, forming a single piece upper housing portion. In some embodiments filter 143 may be removable from upper housing portion 142.

In some embodiments emitter housing 140 may further comprise a fluid flow labyrinth 145. The labyrinth 145 may be provided in optional configuration and forms for example including but not limited to a straight labyrinth, turbulent labyrinth, U-shaped labyrinth, a double orifice labyrinth, single sided labyrinth, double sided labyrinth, the like as is known in the art, or any combination thereof.

FIGS. 7A-D shows a close up cross sectional view of flow control surface 104 that features various optional configurations of flow control opening 110,210 that may be provided with an emitter 140 shown in FIGS. 6A-D. In embodiments, flow control surface 104 featuring flow control opening 110,210, shown in FIGS. 7A-D is provided from a plurality of members. FIGS. 7A-D shows a flow control surface 104 and flow control opening 110,210 that is formed from at least two functional parts comprising at least a portion of diaphragm 144 and at least a portion of lower housing portion 146. Accordingly flow control opening 210 is formed between housing portion 146 provides a first edge 212*a* and base 218 of opening 210, and diaphragm 144 that defines second edge 212*b* of opening 210. Accordingly, flow opening 210 is formed from edge 212*a* and base 218 provided from non-flexible materials while edge 212*b* is provided from flexible materials. FIG. 7E-H shows the behavior of flow control opening 210 in response to a change in pressure applied onto flow control surface 104, accordingly FIG. 7E-H depict changes in the configuration of the flow control opening 110,210 with increasing fluid pressure. FIG. 7E shows the lower to non-fluid pressure and FIG. 7H showing the configuration of flow control opening 210 under the highest fluid pressure. As can be seen diaphragm 144 corresponding to edge 212*b* is pliable and responsive to the fluid pressure changes while base 218 and edge 212*a* are static as they are formed from non-pliable and/or flexible materials.

Flow control opening 210 having a polygonal triangular configuration wherein optionally side edges 212 may be of equal lengths, however, more preferably side edges 212 are of different lengths defining a first edge 212*a* and a second edge 212*b*.

FIGS. 7A-D further shows flow control opening 210 fit with optional configuration for base 218. Flow control opening features a common first end vertex 214, a first edge 212*a*, a second edge 212*b*, each edge having a respective second vertex 216*a*, 216*b*, and featuring a base 218 connecting the second vertices 216*a* and 216*b*. In embodiments base 218 may take any curvilinear form to connect second vertex 216*a* and 216*b*. In embodiments base 218 may be provided with different shapes and/or configurations selected form linear, curvilinear, arcuate, elliptic, polygonal, curved, circular, semi-circular, the like geometric shape or any combination thereof.

FIGS. 7A-D shows opening 210 that is configured such that first edge 212*b* and 212*a* are not of equal length between common first end vertex 214 and base 218.

FIG. 7A shows base 218 an optional configuration wherein base 218 has a curved configuration.

FIGS. 7B and 7C shows base 218 as an optional configuration wherein base 218 is linear, FIG. 7B base 218 forms a substantially right angle triangle. FIG. 7C shows base 218 as having an angled configuration.

FIG. 7D shows an optional embodiment of flow control opening 210,110 wherein at least one edge 212*a*, 112*a* is provided from a plurality of segments including at least two segments 212*c*, 212*d*, for example as shown. Each segment 212*c*,212*d* having a different angle relative to at least one vertex 214 and/or 216. In some embodiments at least one edge 212 may be provided from at least two (212*c*, 212*d*) or more curvilinear segments. For example, as shown edge 212*a* is formed form segments 212*c* and 212*d* respectively. As may be appreciated edge 212*a* may be provided form more than two segments.

Figure 7E:
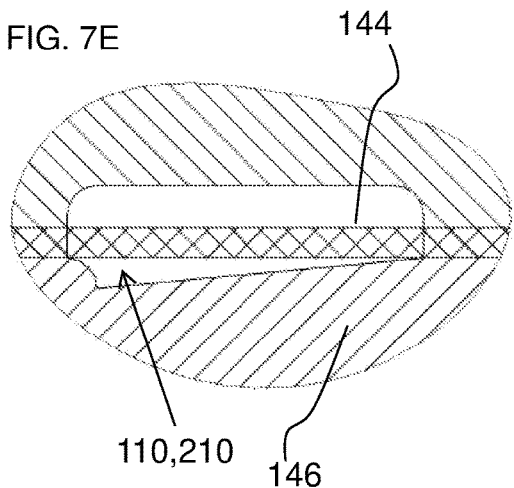
FIGS. 7E-H shows a schematic illustrations of the behavior of a pressure compensated emitter according to an embodiment of the present invention in response to increasing fluid pressure.
Figure 7F:
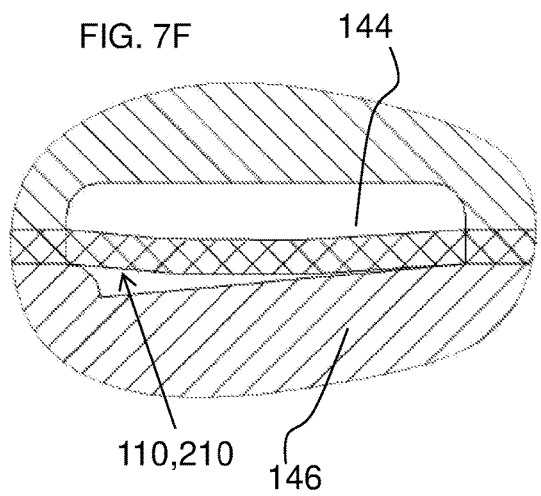
Figure 7G:
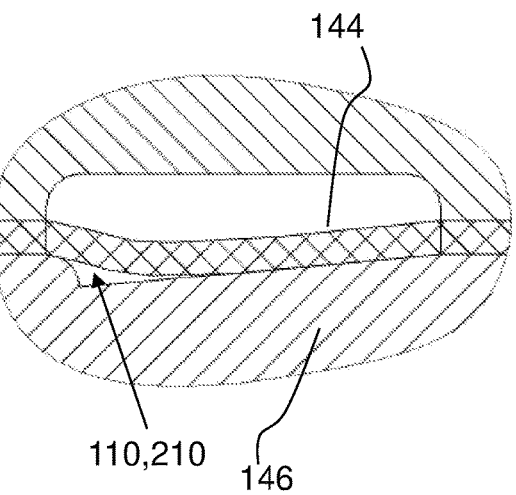
Figure 7H:
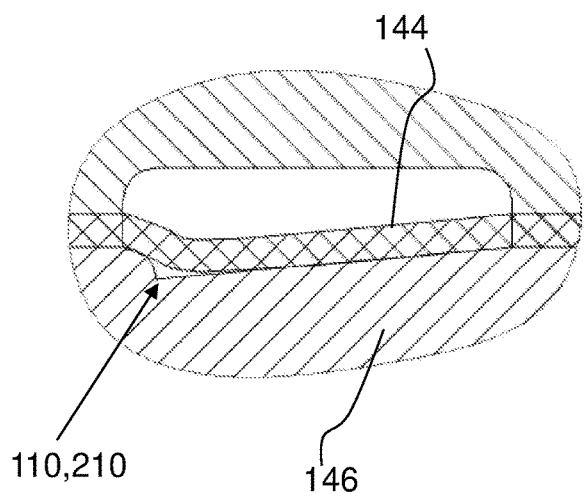

FIGS. 7E-H are schematic illustrations of a portion of device 140 showing the flow control opening 210,110 formed between diaphragm 144 and low cover 146 under increasing fluid pressure environments. FIG. 7E shows the configuration under the lowest pressure, FIG. 7F-7G show the response of the diaphragm 144 to sequential increase in fluid pressure, wherein FIG. 7G shows the highest fluid pressure that is applied to the diaphragm. Accordingly with increased fluid inflow pressure the size of flow control opening 210,110 gradually reduces as shown in FIGS. 7E-7G.

Figure 8:
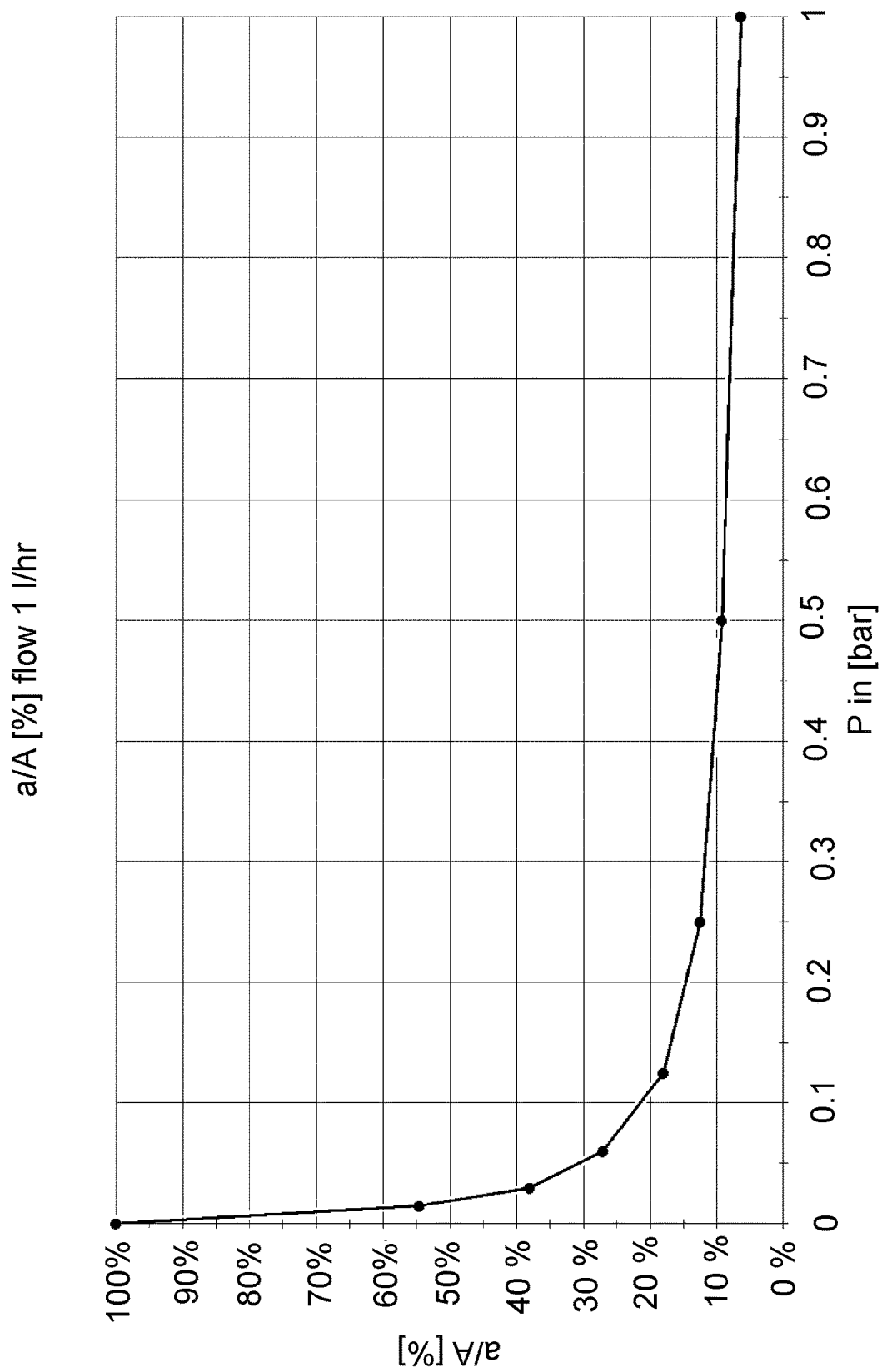
FIG. 8 is a graph showing the change in configuration of the flow control opening in response to inflow fluid pressure, according to embodiments of the present invention.

FIG. 8 provides a schematic graphical depiction of the percentage change in area of the flow control opening 110,210 an inflow fluid pressures of up to 1 bar, during configuration change from the open configuration 110*a*, FIG. 3D, to the controlled configuration 110*b*, FIG. 3E. Furthermore, FIG. 8, shows that flow control opening 110 and in turn device 100 is configured to be sensitive to very low pressure changes allowing opening 110 to assume a stable configuration at low pressure, while as the inflow pressure increases the change in configuration, as shown by the percentage change in area (y axis), remains stable and the percentage change diminishes as the inflow pressure increases. Accordingly, the change and/or transition in configuration of opening 110, from 110*a* to 110*b*, FIGS. 3D-3E is occurs quickly, at very low pressures changes (below 1 bar and as low as 0.005 bar) while configuration 110*b* is maintained as fluid pressure continues to increase.

Accordingly, the configuration of the flow control opening 110 according to embodiments of the present invention allows for maximizing the utilization of the available hydraulic forces acting on device 100 and in particular opening 110 via side walls 102 so as to allow for a flow control opening that is sufficiently sensitive to hydraulic inflow pressure as very low pressure, at below 1 bar, optionally at 0.005 below, and preferably below 0.25 bar. This overcomes prior art flow control valves that do not exhibit these properties at very low pressure and therefore cannot provide stable and/or constant fluid outflow delivery at very low pressures, for example as seen in FIG. 1E and FIG. 2.

Accordingly at an initial fluid pressure inflow of 0 (zero) bar flow control opening 110 assumes the fully open configuration 110*a* as fluid pressure inflow increases, opening 110 quickly assumes the controlled configuration 110*b*, as opening 110 closes from vertex 114 toward base 118 as previously described, to assume the controlled configuration 110*b*, at fluid inflow pressures of below 1 bar.

Furthermore, it is appreciated that opening 110 is sensitive to fluid pressure inflow, allowing device 100 to provide constant fluid outflow in an environment having substantially zero inflow pressure as low as about 0.005 bar, preferably at inflow fluid pressure of lower than 1 bar, and optionally and preferably at inflow pressures of lower than 0.25 bar.

FIG. 9 shows optional configurations for a flow control opening 110 with an optional housing 108, according to optional embodiments of the present invention, in the form of control opening 210 having a generally triangular configuration wherein side edges 212 are not of equal lengths and further showing various optional configurations for base 218.

Flow control opening 210 is shown in the open configuration having a common first end vertex 214, a first edge 212*a*, a second edge 212*b*, each edge having a respective second vertex 216*a*, 216*b*, and featuring a base 218 connecting the second vertices 216*a* and 216*b*. As shown, base 218 may take any curvilinear form to connect second vertex 216*a* and 216*b* with the limitation that it does not extend beyond an imaginary plane 218*p* formed between vertexes 216*a*, 216*b*, for example as shown. Accordingly, base 218 is defined along the plane 218*p* or point internally toward the center of opening 210 and/or toward vertex 214. FIG. 9 therefore shows optional configuration for base 218 for example including but not limited to a linear configuration 218*a*, a curvilinear and/or arcuate and/or convex configuration 218*b*, or a chevron-like linear configuration 218*c*, any combination thereof or the like.

In embodiments base 218 may be provided with different shapes and/or configurations selected form linear, curvilinear, arcuate, elliptic, polygonal, curved, circular, semi-circular, the like geometric shape or any combination thereof.

In an optional embodiment flow control opening 210 may be configured such that first edge 212*b* and 212*a* are not of equal length between a common first end vertex 214 and base 218.

Figure 10C:
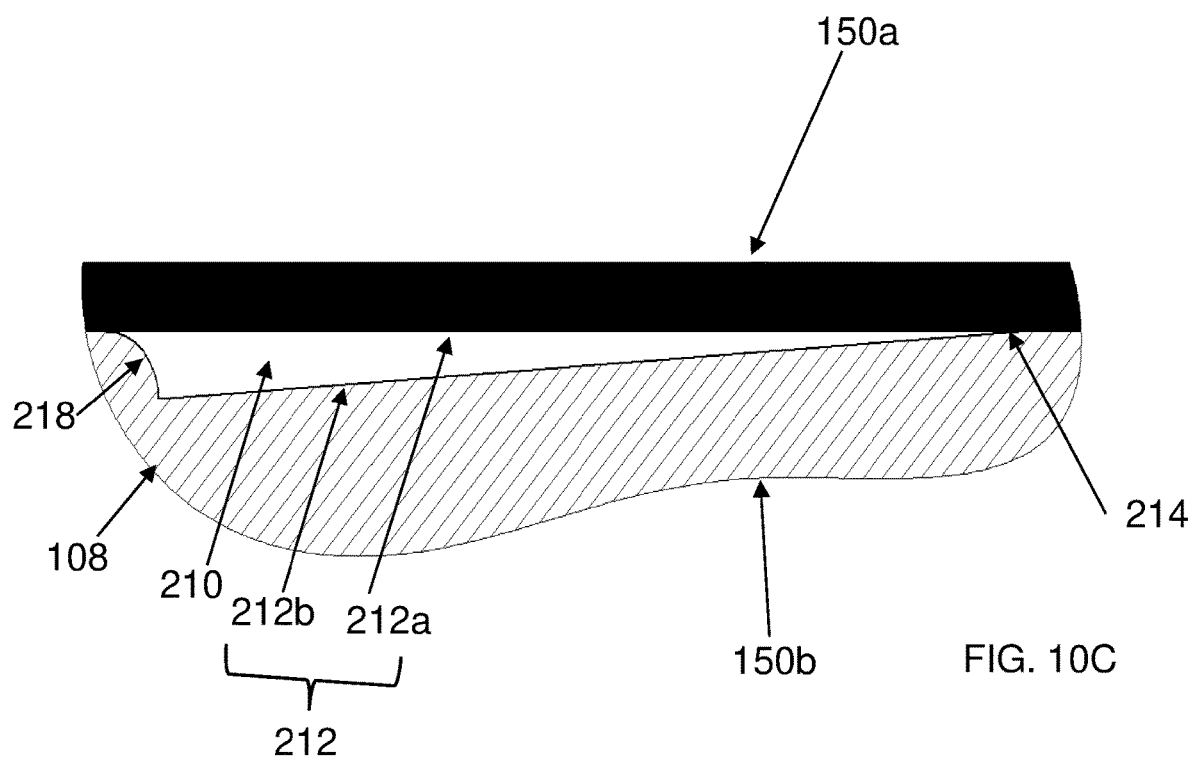

FIGS. 10A-C show a further optional configuration of opening 110,210 as shown in FIG. 9, wherein non-symmetric triangular configuration of opening 210, wherein edges 212*a*,*b* are not of equal lengths and/or hardness configuration, as shown in the form of opening 210 having edges 212*a*, 212*b* respectively, as described in FIG. 9.

As previously described with respect to base 118 base 218 may be provided with different shapes and/or configurations selected form linear, curvilinear, arcuate, elliptic, polygonal, curved, circular, semi-circular, the like geometric shape or any combination thereof.

FIG. 10A shows an embodiment wherein opening 210 is provided with uniform hardness and/or elasticity and/or flexibility and/or pliability surrounding opening 210 about surface 104. Accordingly surface 104 is configured to have a uniform level of hardness and/or elasticity and/or flexibility and/or pliability surrounding opening 210.

FIG. 10B shows an embodiment wherein surface 104 surrounding opening 210 is configured to have a level of hardness and/or elasticity and/or flexibility and/or pliability that is non-uniformly distributed around opening 210 wherein first edges 212*a* has a first level of pliability relative to surface 104 while edge 212*b* has a second level of pliability 150 as is shown. Accordingly, the opening 210 has two hardness and/or flexibility and/or pliability levels on either edges of side edges 212*a,b* respectively.

In some embodiments second level of pliability 150 may be provided from plastic and/or non-pliable and/or non-flexible materials.

FIG. 10C shows a top view of a flow control opening 210 according to an embodiment of device 100 that is disposed within a housing 108 that is in an optional flow pipe 10. Flow control opening 210 is configured to have edges 212*a*, 212*b* each with different hardness and/or pliability levels 150*a*,150*b* respectively, that work together to control the flow through opening 210.

For example, first edge 212*a* may be configured to have a first flexibility and/or pliability and/or hardness level 150*a* that is lower than the flexibility and/or pliability and/or hardness level 150*b* of second edge 212*b*. For example, first edge 212*a* may be provided from pliable materials 150*a* such as silicon and/or rubber, while, second edge 212*a* may be provided from non-pliable and/or hard materials 150*b* having a high hardness level, for example, plastic. Accordingly, in such an optional configuration, edge 212*a* may configured to be more responsive to changes in hydraulic pressure applied along edge 212*a*; therein edge 212*a* is likely to be displaced toward edge 212*b* in a directional manner from vertex 214 toward based 218.

While FIG. 10C shows base 218 as having the same flexibility and/or pliability and/or hardness level as that of edge 212*b*, in some embodiments base 218 may be provided with a further additional flexibility and/or pliability and/or hardness level.

While the invention has been described with respect to a limited number of embodiment, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

It should be noted that where reference numerals appear in the claims, such numerals are included solely or the purpose of improving the intelligibility of the claims and are no way limiting on the scope of the claims.

Having described a specific preferred embodiment of the invention with reference to the accompanying drawings, it will be appreciated that the present invention is not limited to that precise embodiment and that various changes and modifications can be effected therein by one of ordinary skill in the art without departing from the scope or spirit of the invention defined by the appended claims.

Further modifications of the invention will also occur to persons skilled in the art and all such are deemed to fall within the spirit and scope of the invention as defined by the appended claims.

Therefore, the foregoing is considered as illustrative only of the principles of the invention. Further, since numerous modifications and changes will readily occur to those skilled in the art, it is not described to limit the invention to the exact construction and operation shown and described and accordingly, all suitable modifications and equivalents may be resorted to, falling within the scope of the invention.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the scope of the appended claims.

Citation or identification of any reference in this application shall not be construed as an admission that such reference is available as prior art to the invention. Section headings are used herein to ease understanding of the specification and should not be construed as necessarily limiting.

While the invention has been described with respect to a limited number of embodiments, it will be appreciated that many variations, modifications and other applications of the invention may be made.

What is claimed is:

1. A flow control valve providing a constant outflow in a variable inflow fluid pressure environment, the flow valve comprising:
   a) a body portion having a flow port therethrough defining an inlet at one end and an outlet at an opposite end;
   b) said inlet features a flow control surface and at least two side walls extending distal from said control surface toward said outlet; at least a portion of said inlet comprising pliable materials configured to render said inlet reactive to pressure changes; and wherein in response thereto said flow control surface regulates outflow through said flow control valve-;
   c) said flow control surface featuring at least one flow control opening for controlling the outflow through the valve; said at least one flow control opening having a polygon configuration defining two edges having a single common vertex-, each of said edges having a second vertex that is spaced apart by a distance defining a base of said polygon and wherein said base does not extend beyond an imaginary plane-formed external to said second vertex; and wherein said base extends internal to said opening; and wherein in response to an increase in pressure applied to said inlet at least one of said base or at least one said two edges are configured to collapse internally to said flow control opening toward one another.

2. The device of claim 1 wherein a first edge of said two edges is provided from non-pliable materials and wherein a second edge is provided from pliable materials.

3. The device of claim 2 wherein said base is linear having n edges wherein n is at least two or more.

4. The device of claim 1 wherein a first edge of said two edges and a second edge of said two edges are provided from materials of different degrees of pliability.

5. The device of claim 1 wherein a first edge of said two edges and a second edge of said two edges are provided from different materials.

6. The device of claim 1 wherein the degree of pliability of said first edge is configured to be smaller than the degree of pliability of said second edge, wherein said second edge is more pliable than said first edge.

7. The device of claim 1 wherein said base and said first edge are provided from non-pliable materials and wherein said second edge is provided from pliable materials.

8. The device of claim 1 wherein said base is linear along said imaginary plane.

9. The device of claim 1 wherein said base is configured to be one of: convex, curvilinear, arcuate, ellipsoid, curved, or circular.

10. The device of claim 1 wherein said two edges are equal in length, forming an isosceles polygon configuration.

11. The device of claim 1 wherein said two edges have different lengths defining a first edge and a second edge.

12. The device of claim 1 wherein at least one of said two edges is formed from at least two sub-segments.

13. The device of claim 12 wherein at least one of said two sub-segments is curvilinear.

14. The device of claim 12 wherein said at least two sub-segments are configured to have a different angle relative to at least one vertex.

15. The device of claim 1 wherein the flow control surface comprises at least two flow control openings.

16. The device of claim 1 wherein said flow control opening is centered along said flow control surface.

17. The device of claim 1 wherein said flow control opening is disposed along said flow control surface in a manner selected from one of: centrally, symmetrically, asymmetrically, symmetric along at least one axis, asymmetric along at least one axis.

18. The device of claim 1 wherein said body is fit within a housing.

19. The device of claim 18 wherein said housing is one of: a drip irrigator housing, forms at least a portion of an inline assembly, forms at least a portion of a flag dripper assembly, forms at least a portion of an online dripper assembly, in the form of an emitter, integrated with a pipe, is in the form of a sprinkler valve.

20. The device of claim 18 wherein said housing forms at least a portion of a pressure compensated housing including a diaphragm wherein a portion thereof defines at least one of said at least two side walls and one of said at least two edges.

21. The device of claim 20 wherein said pressure compensated housing further comprises at least one or more selected from: a filter, and a fluid flow labyrinth.

22. The device of claim 20 wherein at least one of said at least two side walls is formed by at least a portion of said pressure compensated housing.

23. The device of claim 22 wherein said base is formed by at least a portion of said pressure compensated housing.

24. The device of claim 1 wherein the flow control surface is configured to have a non-uniform level of pliability surrounding said flow control opening.

25. The device of claim 24 wherein the non-uniform level of pliability surrounding said flow control opening is disposed along at least a portion of at least one side edges or the base.

26. The device of claim 24 wherein the device is configured to have at least two levels of pliability surrounding said flow control opening.

27. The device of claim 24 wherein each side edge is individually configured to have an individual level of hardness and/or elasticity and/or flexibility and/or pliability.

* * * * *